United States Patent

Bar et al.

[11] Patent Number: 5,617,261
[45] Date of Patent: Apr. 1, 1997

[54] MIRROR ARRANGEMENT WITH A DEFORMABLE MIRROR ELEMENT

[75] Inventors: Klaus Bar, Lauf; Reinhard Schmiedl, Weissenburg, both of Germany

[73] Assignee: Diehl GmbH & Co., Nürnberg, Germany

[21] Appl. No.: 441,221

[22] Filed: May 15, 1995

[30] Foreign Application Priority Data

Feb. 11, 1993 [DE] Germany .......................... 43 04 059.4

[51] Int. Cl.⁶ .................................................. G02B 5/08
[52] U.S. Cl. .................. 359/845; 359/224; 359/846; 359/847
[58] Field of Search .................... 359/845, 846, 359/847, 871, 224

[56] References Cited

U.S. PATENT DOCUMENTS

| | | |
|---|---|---|
| 4,387,962 | 6/1983 | Gowan et al. . |
| 4,674,848 | 6/1987 | Aldrich et al. . |
| 5,094,519 | 3/1992 | Ealey et al. ............................. 359/845 |

FOREIGN PATENT DOCUMENTS

| | | |
|---|---|---|
| 3900467 | 7/1990 | Germany . |
| 4138557A1 | 5/1993 | Germany ................................ 359/846 |
| 4206792A1 | 9/1993 | Germany ................................ 359/846 |
| 2184562 | 6/1987 | United Kingdom . |
| 2249641 | 5/1992 | United Kingdom .................... 359/845 |

OTHER PUBLICATIONS

Kosugi, Abstract of Japanese patent Document 63–205976, Patent Abstract of Japan, vol. 12, No. 493 (E–697) (3340), 1988.

Primary Examiner—Timothy P. Callahan
Assistant Examiner—Jung Ho Kim
Attorney, Agent, or Firm—Scully, Scott, Murphy & Presser

[57] ABSTRACT

A mirror arrangement with a deformable mirror element, and which includes a housing which is provided for the retention of the mirror element, and whereby a cooling installation is provided for the conducting off of excess heat or thermal energy from the mirror arrangement. The cooling installation possesses a cooling chamber or space provided in the housing which is streamed through by a flow of a cooling medium and which, through an inherently stable separator element constituted from a good heat-conductive material, is spatially separated from a heat-conductive filled outer chamber which is located directly behind the base plate of the mirror.

7 Claims, 1 Drawing Sheet

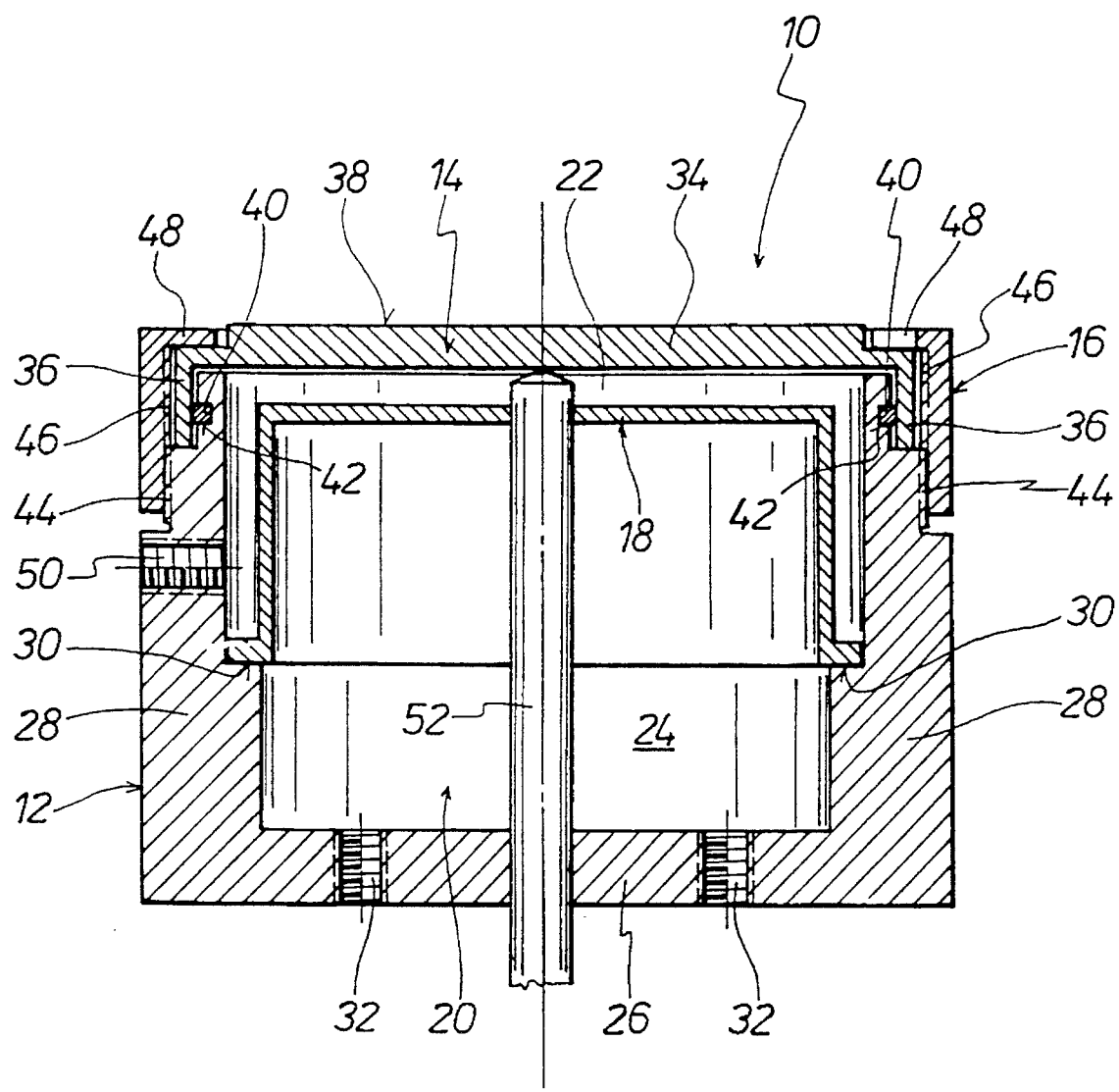

MIRROR ARRANGEMENT WITH A DEFORMABLE MIRROR ELEMENT

BACKGROUND OF THE INVENTION

1. Field of the Invention

The present invention relates to a mirror arrangement with a deformable mirror element, and including housing which is provided for the retention of the mirror element, and whereby a cooling installation is provided for the conducting off of excess heat or thermal energy from the mirror arrangement.

2. Discussion of the Prior Art

A mirror arrangement of this type is already known from the disclosure of German Laid-open Patent Publication No. DE 39 00 467 A1. In that instance, the cooling installation forms a constructional unit or module which is spatially separate from the mirror arrangement, and which is located in proximity to a pressure generator for the pressurized fluid. In this known mirror arrangement; in essence, the pressurized fluid is suitably cooled down externally of the mirror arrangement within the cooling installation. As a consequence of the fact that the cooling installation forms a constructional unit which is spatially separate from the mirror arrangement, and the pressurized fluid also concurrently forms the cooling medium for the mirror arrangement, there is obtained a relatively sluggish cooling action, which can lead to that the mirror element, during the operation of the mirror arrangement, and in particular due to heating up, can still be buckled or arched in an undesirable manner.

SUMMARY OF THE INVENTION

Accordingly, it is an object of the present invention to provide a mirror arrangement of the above-mentioned type, in which the cooling effect is further improved at a comparatively simple construction of the mirror arrangement, without adversely influencing the controlled curvature of the mirror element or; in essence, that of the base plate of the mirror element.

The foregoing object is inventively obtained for a mirror arrangement of the above-mentioned type in that the cooling installation possesses a cooling chamber or space provided in the housing which is streamed through by a flow of a cooling medium and which, by means of an inherently stable separator element constituted from a good heat-conductive material, is spatially separated from a heat-conductive filled outer chamber which is located directly behind the base plate of the mirror.

Further modifications and inventive features of the mirror arrangement can be readily ascertained from the detailed description as set forth herein below.

The advantages which are obtained by means of the inventive mirror arrangement consist of in that it is extremely simply constructed, which imparts a positive effect on its manufacturing costs and consequently on its easy repairability; and whereby there is facilitated an optimized conducting-off of heat from the mirror arrangement, whereby the pressurized fluid and the cooling medium are suitably selectable independently of each other. Above all, the pressure of the cooling medium which streams through the arrangement is now without any influence over the curvature of the mirror surfaces, which can be set through the intermediary of a pressurized fluid in a separate pressure chamber or; in essence, by means of a linear actuator in contact directly behind the base plate of the mirror.

BRIEF DESCRIPTION OF THE DRAWING

Further details, features and advantages can now be readily ascertained from the following detailed description of an exemplary embodiment of an inventive embodiment of the mirror arrangement, taken in conjunction with the accompanying single figure of drawing.

DETAILED DESCRIPTION

Illustrated in a longitudinal cross-sectional view in the single figure of the drawing is a mirror arrangement 10 with a cup-shaped housing 12, a mirror element 14, a fastening member 16 for positioning the mirror element 14 on the cup-shaped housing 12, and a separator element 18 by means of which the central space 20 within the cup-shaped housing 12 is divided into an outer chamber 22 and the actual cooling chamber 24 for the conducting-off or discharge of the heat from the curveable base plate 34 of the mirror. The cup-shaped housing 12 possesses a bottom 26 and a sidewall structure 28 which unitarily extends away from the bottom 26. The cylindrical sleeve-shaped sidewall structure 28 is on the inside thereof formed with a ring-shaped or annularly encompassing shoulder or flange 30, on which there lies the separator element 18. The separator element 18 consists of an inherently stable and good heat-conductive material, such as copper. The bottom 26 of the cup-shaped housing 12 is provided with connectors 32 for a cooling medium, which connect into the cooling chamber 24. With respect to the above-mentioned cooling medium, this can pertain to water. The forcible flow of the cooling medium generates a pressure in the cooling chamber 24 which, depending upon circumstances, is not constant; however, but which due to the presence of the separator element 18 will not itself mechanically influence the base plate 34 of the mirror.

The mirror element 14 is constructed cup-shaped with a deformable mirror base plate 34 and with a collar 36 extending away at the rear side from the encompassing edge of the base plate 34 of the mirror. The mirror surface is designated with the reference numeral 38. The outer chamber 22 is; in effect, bounded by the base plate 34 of the mirror, through the sidewall structure 28 of the cup-shaped housing 12 and through the inverted cup-shaped separator element 18. Located between the encompassing collar 36 of the element 14 and the sidewall structure 28 of the housing 12 is at least one sealing element 40. This sealing element 40 can be constructed as an O-ring seal which is arranged in a surrounding groove 42 formed in the sidewall 28 of the housing 12. The sidewall 28 is additionally provided with an external screwthreaded portion 44, and the fastener member 16 is formed as a clamping nut with an internal screwthread 46 and a fastening flange 48, so as to render it possible to exchangeably fasten the mirror element 14 on the housing 12 and to flood the outer chamber 22 with a good thermal or heat-conductive fluid, such as oil or water, when it does not serve as a pressure chamber for the curvature of the base plate 34 of the mirror.

Communicating with the outer chamber 22 is at least one connector 50 for a pressurized fluid, when the outer chamber 22 serves as a pressure chamber for an externally-controlled mirror curvature.

The curvature of the mirror base plate 34 of the mirror element 14 is, in essence, then only proportional to the pressure of the pressurized fluid in the outer chamber, or respectively, the pressure chamber 22. An undesired temperature-caused curvature or arching of the mirror base plate 34 is hereby prevented in that a temperature rise in the pressurized fluid which is located in the outer chamber 22, by means of a corresponding heat discharge by means of the separator element 18 into the cooling chamber 24, through which there streams the cooling medium.

In the interest of obtaining a good discharge or conducting-off of the heat loss which is generated in the mirror base plate 34 from a high-energy laser beam which is reflected at the mirror surface 38, the distance from the rear side of the mirror base plate 34 to the cooling chamber 34 as maintained small as possible. For this purpose, the region of the most possibly thin-walled but inherently stable and plate-shaped, or as illustrated, cup-shaped separating element 18 which is in parallel with the base plate 34 of the mirror, extends closely behind the mirror base plate 34, and thereby bounds an axially most possibly flat, narrow outer space 22 behind the mirror base plate 34. This also increases the limiting frequency of the alternating-pressure control.

When the controlled curvature or arching of the mirror base plate 34 should not be varied by means of the pressure in the outer space 22, but through the utilization of a linear-actuator 52 which is supported against the housing 12, and which extends in a sealed manner through the separator element 18, and lies against the inner or, respectively, rear side of the mirror base plate 34, then there is no need for the connector 50 for a controlled pressure variation or, respectively, fluctuation in the outer chamber 22; then it only serves for the thermal bridging-over to the cooling chamber 24, whose possible pressure fluctuations will not influence the mirror geometry in addition to the effect of the actuator pressure.

What is claimed is:

1. A mirror arrangement, including a deformable mirror element having a base plate; a housing; fastening means for attaching the mirror element to said housing; a cooling installation for conducting-off excess heat energy from the mirror arrangement, said cooling installation comprising a cooling chamber located within said housing, said cooling chamber being streamed through by a cooling medium; separator element consisting of a good heat-conductive material being mounted within said housing spaced from said base plate so as to form a second chamber in said housing separated from said cooling chamber, said second chamber being a heat-conductive material filled outer chamber which is located directly behind said base plate of said mirror element, said separator element possessing a planar surface region in said housing extending generally parallel relative to the base plate of said mirror element and dividing said housing into said outer chamber and said cooling chamber such that said outer chamber is of a smaller volume than said cooling chamber, said housing being cup-shaped and having a bottom and a peripheral sidewall extending from said bottom, said mirror element closing off the cup-shaped housing on a side distant from the bottom, said separator element being supported in said housing on a supporting structure formed in the sidewall, and the sidewall including an internal peripheral shoulder forming the supporting structure for the separator element.

2. A mirror arrangement as claimed in claim 1, wherein said separator element possesses a large-surfaced heat-transmissive cross-sectional geometry.

3. A mirror arrangement as claimed in claim 1, wherein said housing possesses at least one connector communicating with the outer chamber for a pressurized fluid, and at least two connectors for the cooling medium communicating with the cooling chamber.

4. A mirror arrangement as claimed in claim 3, wherein the connectors for the cooling medium are located in the bottom of said housing.

5. A mirror arrangement as claimed in claim 1, wherein said base plate is deformable, said mirror element is cup-shaped and includes a depending collar extending about an outer peripheral portion of said housing; and a fastening element for attaching said mirror element to the housing.

6. A mirror arrangement as claimed in claim 5, wherein said housing is equipped with a screw-threaded portion on a sidewall thereof encompassing said depending collar of said mirror element, and the fastening element comprises a clamping nut having an internal screwthread threadingly engageable with said screwthreaded housing portion.

7. A mirror arrangement as claimed in claim 1, wherein at least one linear-actuator extends through said housing bottom and separator element and has an end which is engageable with the mirror base plate.

* * * * *